(No Model.)
T. SHAW.
APPARATUS FOR PURIFYING MINE WATER.
No. 252,974. Patented Jan. 31, 1882.
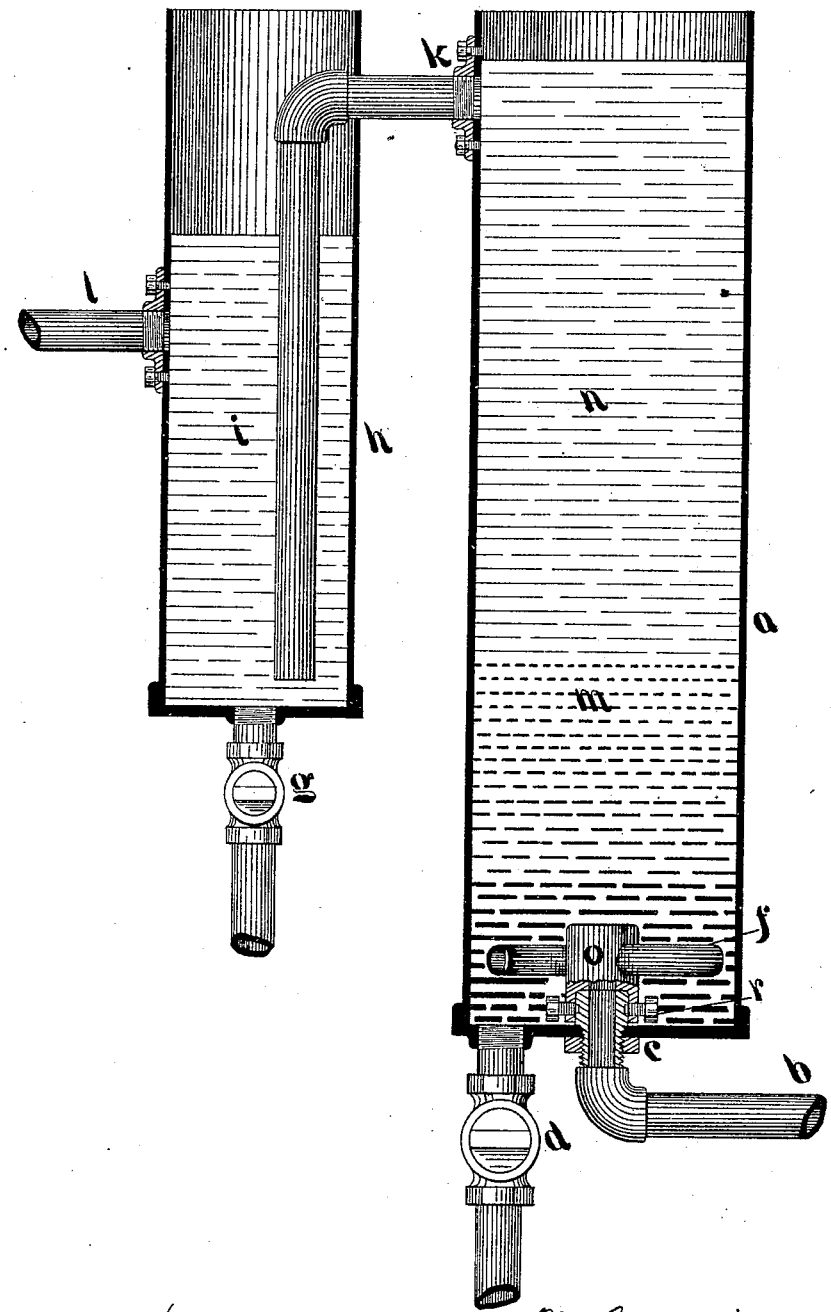

UNITED STATES PATENT OFFICE.

THOMAS SHAW, OF PHILADELPHIA, PENNSYLVANIA.

APPARATUS FOR PURIFYING MINE-WATER.

SPECIFICATION forming part of Letters Patent No. 252,974, dated January 31, 1882.

Application filed November 18, 1881. (No model.)

*To all whom it may concern:*

Be it known that I, THOMAS SHAW, of the city and county of Philadelphia, Pennsylvania, have invented a new and Improved Apparatus for Purifying Mine-Water; and I hereby declare the following to be a full, clear, and exact description of the same, reference being had to the accompanying drawing, and to the letters of reference marked thereon.

My invention consists in the employment of one or more subsiding-tanks, in combination with a mechanical agitator for the utilization of lime, operating in the manner and for the purpose hereinafter described.

The object of the invention is to enable the use of mine-waters for steam purposes, and to prevent the corrosive action of the sulphurous and carbonic acid in the mine-water upon the boilers, &c., in which it is used.

In order to enable others to use and practice my invention, I will proceed to describe its construction and operation.

On reference to the accompanying drawing, which forms part of the specification, the sketch represents a vertical section through center of two tanks, $a$ and $h$, with the inlet-pipe $b$, for entrance of mine-water from any source of pressure.

The water enters the two recoil-arms $f$, which arms are simply metal tubes with their outer ends bent in opposite directions to cause the water to be injected in tank $a$ at a tangent from the radius-line, the effect of which is to rotate said arms $f$ whenever the water is injected by external pressure. Said recoil-arms $f$ are secured to hub $o$, that revolves freely on boss-journal $c$, which is secured firmly to bottom of tank $a$. The screws $r$, secured to hub $o$, work in annular groove in journal $c$, or the screws can be screwed up tight to prevent rotation, as desired, all for the purpose hereinafter described.

$d$ is outlet-valve for semi-fluids, and $k$ is outlet for water free from acid into storage-tank $h$.

$g$ is outlet-valve for any sediment in tank $h$, and $l$ is outlet-pipe for purified water, to be used for steam and other purposes.

The tanks shown are supported in position by any of the ordinary methods of supporting tanks. Said tanks are given great length in a vertical direction to favor subsidence of solid matter, operating as hereinafter described.

The apparatus is operated in this wise: Ordinary burned lime is thrown into tank $a$ in sufficient quantity to fill said tank one-quarter or one-fifth full when in a slaked condition. The mine-water is forced through said lime from any source of pressure through pipe $b$ and recoil-arms $f$, the water being injected into the lime from the outer ends of said arms $f$. The lime dissolves by virtue of the presence of the water, and commingles with the water to a point half-way up the tank, the lime taking up all the sulphurous acid, forming sulphate of lime, and at the same time it takes up the carbonic acid, forming carbonate of lime. The sulphate and carbonate of lime being solids, they gradually subside or keep to the lower part of the tall tank $a$, permitting the pure waters to rise up between said solids and finally emerge as clear water at the top, where it is permitted to flow off into a storage-tank, $h$, through pipe $k$, which leads to the bottom of tank $h$, as shown, to prevent agitation of the surface of water in tank $h$, and to permit any further subsidence of solid matter that may come over in said tank by any undue agitation of water in tank $a$. The purified water $i$ in tank $h$ is drawn off by pipe $l$ for steam or other purposes. The valve $g$ permits the drawing off of any fine sediment in said tank $h$. When in the course of a day or longer operation the lime in tank $a$ becomes saturated with sulphurous acid, it is drawn off by valve $d$ and a fresh supply substituted. The rejected sulphate of lime can be used for agricultural purposes. The recoil-arm $f$, when rotated by the action of the injected water, agitates the semi-fluid lime at the bottom of tank $a$, thus bringing new surfaces of lime in contact with the water. The same effect, in less degree, is caused by bolting said recoil-arms in a stationary manner by screws $r$, when the injected water through said bent arms $f$ produces a rotative effect upon the semi-fluid lime, agitating and rotating the same, bringing new surfaces of lime in contact with the water, which greatly facilitates the action of the lime upon the acids in the water and causes a more complete utilization of the lime.

It will be evident that the within-described apparatus can be considerably modified without any alteration in the result.

What I claim, and desire to secure by Letters Patent, is—

1. In a mine-water-purifying apparatus, the combination of a vertical tank, an inlet-pipe communicating with the lower end, and an agitator arranged near the lower end, substantially as and for the purpose set forth.

2. In a mine-water-purifying apparatus, upright subsiding-tank, in combination with injecting-pipe $b$, entering the bottom of said tank, and provided with a device for admitting and circulating the water, substantially as set forth.

THOMAS SHAW.

Witnesses:
WM. GARWOOD,
WM. B. HUGHES.